(12) United States Patent
Hui et al.

(10) Patent No.: US 10,548,015 B2
(45) Date of Patent: Jan. 28, 2020

(54) MOBILE DEVICE SECURITY LOCK

(71) Applicant: BITwave Pte Ltd, Singapore (SG)

(72) Inventors: Siew Kok Hui, Singapore (SG); Eng Sui Tan, Singapore (SG); Man Tuck Pang, Singapore (SG)

(73) Assignee: BITwave Pte Ltd, Singapore (SG)

( * ) Notice: Subject to any disclaimer, the term of this patent is extended or adjusted under 35 U.S.C. 154(b) by 224 days.

(21) Appl. No.: 15/606,840

(22) Filed: May 26, 2017

(65) Prior Publication Data

US 2018/0199202 A1 Jul. 12, 2018

Related U.S. Application Data

(60) Provisional application No. 62/444,366, filed on Jan. 9, 2017.

(51) Int. Cl.
*H04L 29/06* (2006.01)
*H04W 12/08* (2009.01)

(52) U.S. Cl.
CPC ........... *H04W 12/08* (2013.01); *H04L 63/083* (2013.01); *H04L 63/10* (2013.01)

(58) Field of Classification Search
CPC ....... H04W 12/08; H04L 63/083; H04L 63/10
See application file for complete search history.

(56) References Cited

U.S. PATENT DOCUMENTS

| 8,467,770 | B1* | 6/2013 | Ben Ayed | H04L 63/107 455/411 |
| 8,498,618 | B2* | 7/2013 | Ben Ayed | H04L 63/0492 455/41.2 |
| 9,336,356 | B2* | 5/2016 | Parla | G06F 21/00 |
| 10,212,136 | B1* | 2/2019 | Gehret | H04L 63/0428 |
| 2002/0194500 | A1* | 12/2002 | Bajikar | H04L 63/102 726/35 |
| 2005/0076242 | A1* | 4/2005 | Breuer | H04W 12/08 726/4 |
| 2006/0199538 | A1* | 9/2006 | Eisenbach | G06F 21/6218 455/41.2 |
| 2010/0062712 | A1* | 3/2010 | Lakshmanan | H04L 63/083 455/41.2 |
| 2011/0225426 | A1* | 9/2011 | Agarwal | G06F 21/41 713/175 |
| 2012/0226912 | A1* | 9/2012 | King | G06F 21/31 713/183 |

(Continued)

*Primary Examiner* — John B King
(74) *Attorney, Agent, or Firm* — Amin, Turocy & Watson, LLP

(57) ABSTRACT

Management of a mobile device security lock is described herein. A method as described herein includes connecting, by a system comprising a processor, to a trusted device via a first wireless communication link, receiving, by the system, a lock command from the trusted device, in response to receiving the lock command, transitioning from an open access mode of the system to a limited access mode, connecting, by the system, to a non-trusted device via a second wireless communication link while in the limited access mode, attempting, by the system, to obtain an authorization for communication by the system with the non-trusted device, and in response to the attempting to obtain the authorization being determined to be unsuccessful, preventing the communication with the non-trusted device.

20 Claims, 16 Drawing Sheets

(56) References Cited

U.S. PATENT DOCUMENTS

| | | | | |
|---|---|---|---|---|
| 2014/0026188 A1* | 1/2014 | Gubler | .................. | H04W 12/08 |
| | | | | 726/3 |
| 2014/0165158 A1* | 6/2014 | Chan | ..................... | H04W 12/04 |
| | | | | 726/4 |
| 2014/0270127 A1* | 9/2014 | Becker | .................... | H04M 1/67 |
| | | | | 379/194 |
| 2015/0038073 A1* | 2/2015 | Vang | .................... | H04W 76/10 |
| | | | | 455/41.1 |
| 2015/0079943 A1* | 3/2015 | Williams | .............. | H04W 12/08 |
| | | | | 455/411 |
| 2015/0135298 A1* | 5/2015 | Robison | .................. | G06F 21/31 |
| | | | | 726/10 |
| 2016/0098878 A1* | 4/2016 | Cabouli | .................. | G06F 21/32 |
| | | | | 340/5.52 |
| 2016/0277362 A1* | 9/2016 | Baumgarte | ......... | H04L 63/0428 |
| 2016/0316369 A1* | 10/2016 | Jiang | ..................... | H04W 12/06 |
| 2018/0077168 A1* | 3/2018 | Shen | ..................... | G06F 1/3215 |

\* cited by examiner

MOBILE DEVICE SECURITY LOCK

CROSS-REFERENCE TO RELATED APPLICATIONS

The present application claims the benefit of priority to U.S. Provisional Patent Application No. 62/444,366, filed Jan. 9, 2017, and entitled "Mobile Device Security Lock," the entirety of which application is incorporated herein by reference.

TECHNICAL FIELD

The present disclosure relates to wireless communications, and in particular, to security protocols for restricting access to devices in a wireless communication system.

BACKGROUND

Today, there are a significant number of mobile communication devices, such as consumer devices that utilize the Bluetooth communication protocol, in the market. As mobile device technology has advanced, the number of Bluetooth mobile devices, and the number of uses for such devices, has similarly increased. As a result of these advances, Bluetooth devices have become increasingly ubiquitous enablers of collaboration and other communication between people and the world around them. As an example, Bluetooth-enabled helmets have been developed that can enable groups of bikers to communicate while on the move, groups of workers to communicate to collaborate on shared projects, etc.

Bluetooth mobile devices, as well as other mobile devices, are vulnerable to theft or accidental loss due at least in part to their small size. As the small size of such devices enable them to be highly mobile, they are commonly used in public places, such as on the road or traveling from one location to another. This public use increases the likelihood that such devices can be lost or stolen.

Additionally, some Bluetooth mobile devices and/or other portable electronic devices may contain sensitive data, such as voice recordings and/or video recordings of a user, user contacts, emails and/or other potentially sensitive information, etc. Thus, if a device enters the possession of an unauthorized user, information contained on that device could also potentially be accessed by that unauthorized user. In view of at least the above, it is desirable to implement techniques for securing access to Bluetooth devices and/or other portable electronic devices against unauthorized users.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In one embodiment, a method is described herein. The method includes connecting, by a system including a processor, to a trusted device via a first wireless communication link, receiving, by the system, a lock command from the trusted device, transitioning from an open access mode of the system to a limited access mode in response to receiving the lock command, connecting, by the system, to a non-trusted device via a second wireless communication link while in the limited access mode, attempting, by the system, to obtain an authorization for communication by the system with the non-trusted device, and preventing the communication with the non-trusted device in response to the attempting to obtain the authorization being determined to be unsuccessful.

In another embodiment, a system is described herein. The system includes a processor and a memory that stores executable components that, when executed by the processor, facilitate performance of operations. The executable components include a communication component that connects to a first device via a first wireless communication link and to a second device via a second wireless communication link, a mode selection component that initiates a restricted access mode of the system in response to reception of a lock command from the first device via the communication component, an authentication component that attempts to match an identity of the second device with at least one of a group of trusted devices in response to the restricted access mode being initiated by the mode selection component, and a control component that disables communication with the second device pending receipt of an authorization in response to the authentication component unsuccessfully attempting to match the identity of the second device with at least one of the group of trusted devices.

In a further embodiment, a method is described herein. The method includes facilitating, by a system including a processor, making a connection by the system to a remote device via a wireless communication link, receiving, by the system, a first command to lock the remote device, authenticating, by the system, the first command, and configuring, by the system, the remote device to disable communication with respective ones of a group of non-previously connected devices subject to receipt of an authorization from one of a group of previously connected devices in response to authenticating the first command.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
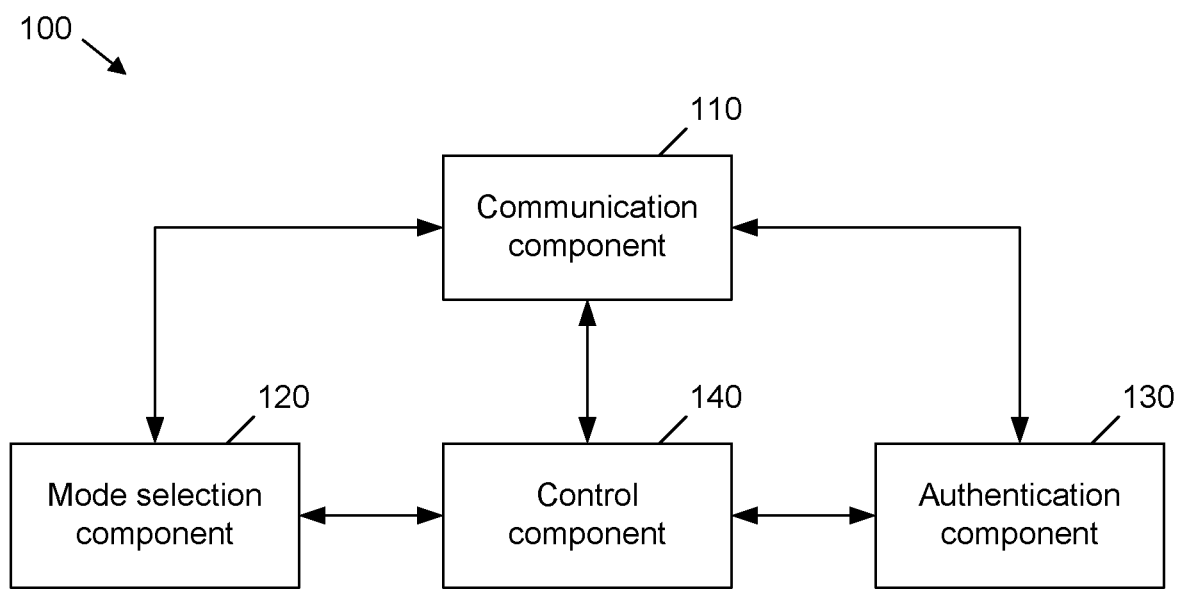
FIG. 1 is a block diagram of a system that facilitates implementation of mobile device security controls in accordance with one or more embodiments described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide methods, systems, and user interfaces that facilitate using a computing device (e.g., a smartphone or other portable electronic device) to lock a remote mobile device via electrical, mechanical and/or wireless means. Mobile devices that can be locked using embodiments described herein include Bluetooth devices, which can include, but are not limited to, Bluetooth cameras, Bluetooth helmet communicators such as the AMP series of helmet communicators, etc. Other mobile devices that operate according to other wireless communication protocols (e.g., Wi-Fi, cellular, etc.) could also be used. While various examples provided herein refer to the specific case of a Bluetooth device, it should be appreciated that this is merely one example of a device that could employ the embodiments described herein, and such examples are not intended to limit the claimed subject matter unless explicitly stated otherwise.

By utilizing the systems and methods provided herein, once a mobile device is locked to a smartphone or other device (referred to herein for simplicity of explanation as a "locking device"), the locked mobile device can be configured to function normally only when it is connected to its locking device. If the locked mobile device at any time is unable to find its locking device, its functionalities can be partially or completely disabled. For instance, the locked device can be configured such that it cannot be used to answer incoming calls, stream music, and/or perform other functions outside of the presence of its locking device. However, the locked device can in some cases be configured to continue functioning normally with devices that have previously paired with the locked device even without the locking device being present. In sum, embodiments described herein provide for techniques by which a mobile device, without the device that locked it, can have various functions disabled when paired with a new (e.g., not previously connected) device, such as a smartphone that differs from a smartphone that locked the mobile device.

In various embodiments described herein, a smartphone or other locking device is used as a security token to protect a mobile device, e.g., a Bluetooth device. For instance, a smartphone located with its user can be utilized to protect connected Bluetooth devices from loss. The smartphone itself can also be protected from loss by a separate token, e.g., a token associated with one or more of the connected Bluetooth devices. If one of the connected Bluetooth devices loses connection with its token, here the user's smartphone, the disconnected device will move to disable substantially all of its functionality, thereby rendering it useless to thieves and/or other unauthorized users.

Further embodiments herein facilitate techniques by which a mobile device user, if so desired, can unlock a locked device by using a computing device having a user interface, an application developed for mobile device security control, and user-defined authentication credentials, as described herein. A device utilized to unlock a locked device in this manner can be the same as the locking device or a different device that has stored thereon the interface, application, and/or other components for mobile device security control as described herein. If a user forgets his or her login credentials (e.g., password, personal identification number (PIN), etc.) for the application, the credentials can be retrieved using a registered email and/or by other means.

The above aspects of the disclosure and/or other features of respective embodiments thereof are described in further detail with respect to the respective drawings below.

Referring first to FIG. 1, shown is a system 100 that facilitates mobile device security controls in accordance with various aspects described herein. The system 100 can be implemented by a mobile accessory device (e.g., a Bluetooth headset, communicator, or the like that connects to a smartphone or other device via a wireless communication link) and/or any other wireless communication device for which access controls are desired. The system 100 includes a communication component 110 that connects to a first device (locking device, master device, etc.) via a first wireless communication link. In one example, the first device is a smartphone and/or other device that includes an application, interface, and/or other means for controlling access to the system 100.

The system 100 further includes a mode selection component 120 that initiates a restricted access mode of the system 100 in response to reception of a lock command from the first device via the communication component 110. In an aspect, the lock command can be sent from the first device via a security control application running on the first device, e.g., by a user of the first device that interacts with the security control application. In response to the lock command, the mode selection component 120 can cause the system 100 to restrict communication with non-trusted or otherwise unknown devices. For instance, the system 100 can maintain a list or other structure indicating respective devices that have previously paired with or connected to the system 100 and may exempt one or more of the indicated devices from the restrictions imposed by the mode selection component 120.

In the event that a second device connects to the system 100 via the communication component 110 while the system 100 is in the restricted access mode, an authentication component 130 can compare an identity of the second device with respective identities of a group of trusted devices, e.g., as defined by the list or other structure of previously connected devices as described above. In response to this comparison indicating that the identity of the second device is a same identity or a substantially similar identity, based on a defined similarity criterion, to an identity of at least one of the respective ones of the group of trusted devices, a control component 140 can identify the second device as a trusted device and permit communication with the second device. Alternatively, if the second device is not in the group of trusted devices and/or the authentication component 130 is otherwise unsuccessful in attempting to match the identity of the second device with that of at least one of the group of trusted devices, the control component 140 can disable communication by the system 100 with the second device pending receipt of a direct or indirect authorization that permits such communication.

Turning next to FIGS. 2A-2E, illustrated is a series of example, non-limiting operations that can be performed in connection with a mobile device security lock as described herein. Here, the operations are performed by a smartphone 202 acting as a locking device and an accessory device, here a Bluetooth headset 204, which implements some or all of system 100 as shown in FIG. 1. It should be appreciated, however, that the operations described with respect to FIGS. 2A-2E could be performed by any suitable devices, having any suitable communication functionality, in addition to and/or in place of the devices 202, 204 shown in FIGS. 2A-2E and described below.

Figure 2A:
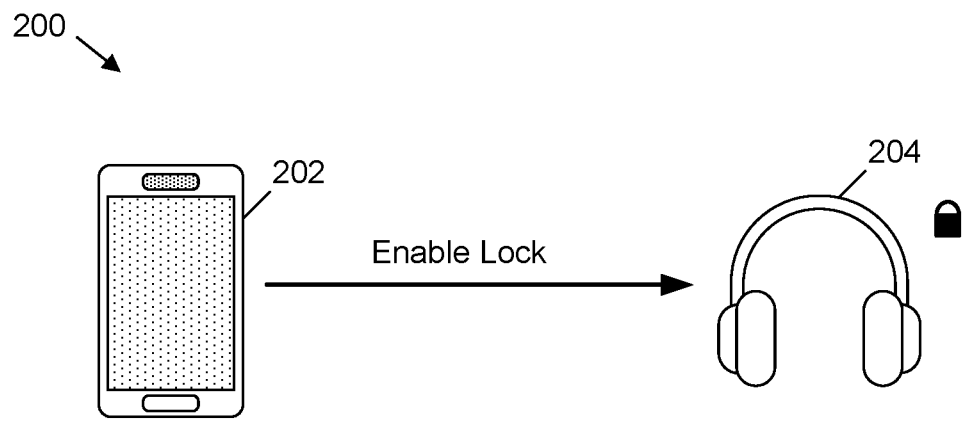
FIGS. 2A-2E are diagrams depicting respective communication operations that can be performed by a mobile device subject to a mobile device security lock in accordance with one or more embodiments described herein.

With reference first to FIG. 2A, diagram 200 shows smartphone 202 being initially connected to (paired with) headset 204. Once a connection between smartphone 202 and headset 204 has been established, diagram 200 further shows that smartphone 202 can send a command and/or other signal to headset 204 in order to enable a security lock at headset 204. This command can be initiated, e.g., by an application, an interface (e.g., a device settings interface), and/or other software components executed by smartphone 202. In an aspect, the command can be provided by a user of smartphone 202, who authenticates with an application running on smartphone 202 and/or one or more external entities (e.g., an authentication server, etc.) using a password, personal identification number (PIN), and/or other credentials.

Once the lock command has been provided and authenticated, the command is received at headset 204, e.g., via a communication component 110. In response to receiving the command, headset 204 can enter a locked (limited access, restricted access, etc.) mode, e.g., via a mode selection component 120. For clarity of illustration, a padlock indicator is provided in FIGS. 2A-2E to illustrate the mode in which headset 202 is operating in the respective drawings.

Figure 2B:
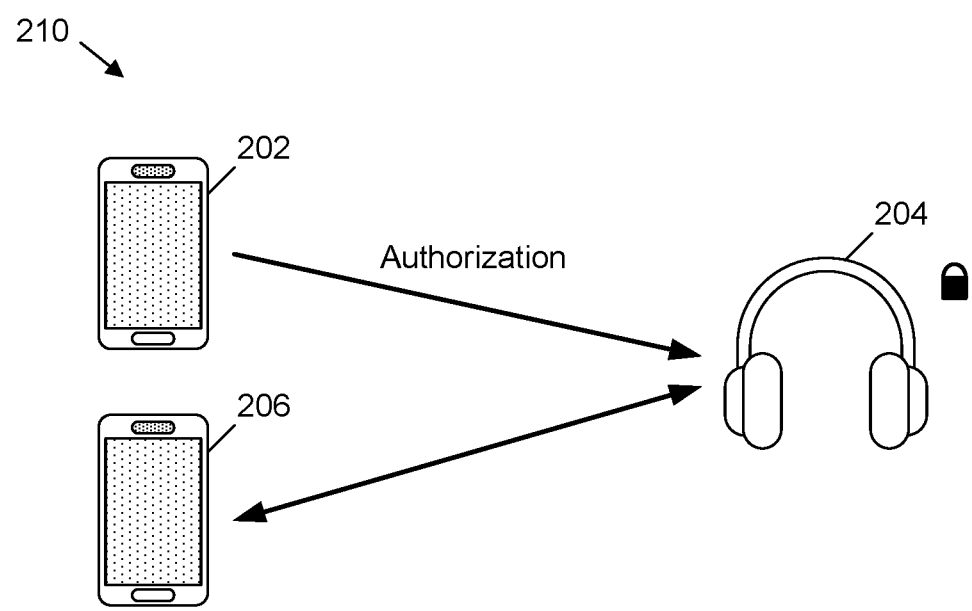

Next, as shown by diagram 210 in FIG. 2B, a second smartphone 206 can connect to and/or pair with headset 204. As headset 204 was placed in a locked mode via the lock command shown in diagram 200, headset 204 can determine (e.g., via an authentication component 130) whether second smartphone 206 is a trusted and/or otherwise pre-authorized device. In an aspect, headset 204 can determine whether second smartphone 206 is pre-authorized by checking an identity of second smartphone 206 against a group of previously paired or connected devices, a group of designated trusted devices, and/or other suitable data structures.

In the example shown in diagram 210, second smartphone 206 is not a trusted device recognized by headset 204. Thus, headset 204 can be configured (e.g., by a control component 140) to communicate with second smartphone 206 only when authorization is given for such communication by first smartphone 202. Such authorization can be given directly, e.g., in a message transmitted from first smartphone 202 to headset 204 that explicitly permits communication with second smartphone 206 for a fixed time period, for the life of the connection with second smartphone 206, permanently, etc. Also or alternatively, authorization can be given indirectly, e.g., based on information received via an active connection with first smartphone 202. In an aspect, information received by headset 204 from first smartphone 202 can be unrelated to authorization. For instance, headset 204 can infer authorization from keep-alive messages and/or any other information received from first smartphone 202 that demonstrates that an active connection between headset 204 and first smartphone 202 continues to exist. In other words, any information that serves to make headset 204 aware that a connection with first smartphone 202 continues to be active can be used as a basis for authorization to communicate with other devices including second smartphone 206.

Figure 2C:
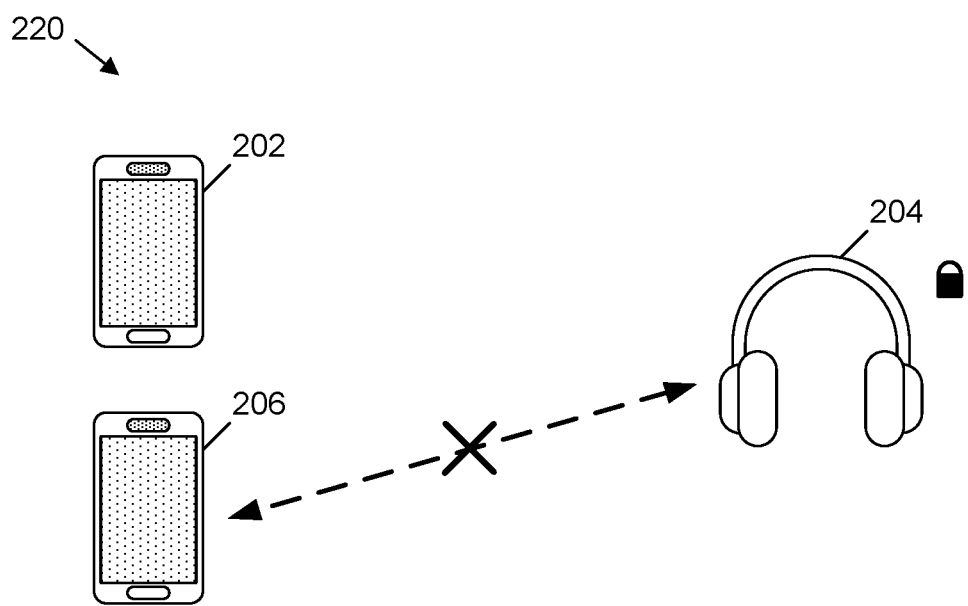

Diagram 220 in FIG. 2C shows a subsequent operation in which the connection between first smartphone 202 and headset 204 is lost. Loss of the connection between first smartphone 202 and headset 204 can be due to first smartphone 202 being powered off, lost and/or otherwise taken out of range of headset 204, a connection failure between first smartphone 202 and headset 204, etc. In response to headset 204 determining that its connection with first smartphone 202 has been lost (e.g., based on failure to receive a keep-alive message and/or other information from first smartphone 202, etc.), headset 204 can disable communication with any devices, such as second smartphone 206, that are connected to headset 204 but are not trusted or pre-authorized devices. In an aspect, headset 204 can entirely disconnect from second smartphone 206, or it can remain connected and/or paired with second smartphone 206 and disable any communication with second smartphone. In another aspect, headset 204 can allow some limited functionality, e.g., the ability to place emergency calls, while disabling other functionality.

Figure 2D:
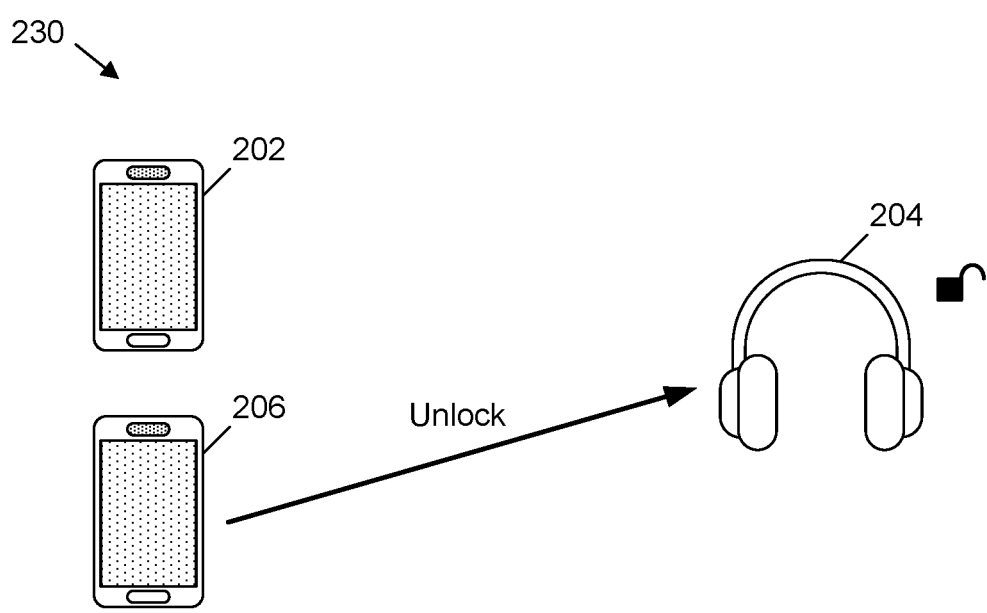

In response to authorization from first smartphone 202 no longer being given and communication between headset 204 and second smartphone 206 being prevented as a result, second smartphone 206 can be configured to send a command to headset 204 to unlock the communication features of handset 204 and permit communication between headset 204 and second smartphone 206, as shown by diagram 230 in FIG. 2D. In an aspect, second smartphone 206 can utilize a similar application to that running on first smartphone 202 to send the unlock command to headset 204. For instance, a user of second smartphone 206 can utilize said application to provide a password, PIN, and/or other credentials along with the unlock command to re-enable communication with headset 204. The credentials used for unlocking headset 204 as shown in FIG. 2D can be the same set of credentials as those used to lock headset 204 as shown in FIG. 2A and/or other credentials.

Figure 2E:
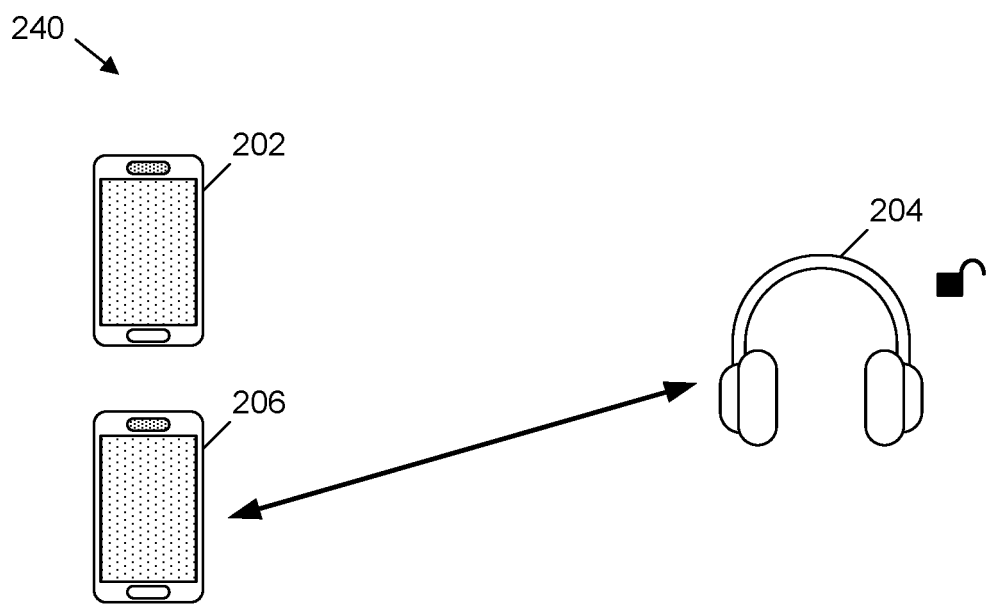

As next shown by diagram 240 in FIG. 2E, the result of the unlock command sent by second smartphone 206 is re-enabled communication between second smartphone 206 and headset 204 even in the absence of the device that locked headset 204, here first smartphone 202. In an aspect, upon receiving the unlock command from second smartphone 206, headset 204 can register second smartphone 206 as a trusted or recognized device such that current and future communication between headset 204 and second smartphone 206 can be permitted even in the absence of first smartphone 202. The unlock command utilized by second smartphone 206 can be a global unlock command, e.g., that disables security locking for itself and all other devices, or the command can be specific to second smartphone 206 only. In the latter case, communication with other non-trusted devices can continue to be disabled in the absence of first smartphone 202 unless separate unlock commands are received at headset 204 from respective devices in a similar manner to that shown by FIG. 2D.

Turning next to FIGS. 3-10, various aspects of the disclosure are shown and described with respect to a series of example interface displays and algorithms. It should be appreciated that the specific displays and algorithms shown in FIGS. 3-10 and described below are intended as merely examples of techniques which can be employed to implement the claimed subject matter, and other techniques falling within the scope of the claimed subject matter are also possible.

In the examples shown by FIGS. 3-10, a Bluetooth mobile device or other suitable mobile communication device is paired to a locking device, here a smartphone but other locking devices are possible. For purposes of the below description, the mobile device that can have its security features controlled via the locking device is referred to herein as a secured device. The smartphone has stored thereon an application that controls security features of the secured device. The application, when launched, can identify the secured device and/or one or more other devices for which security controls are available.

Figure 3:
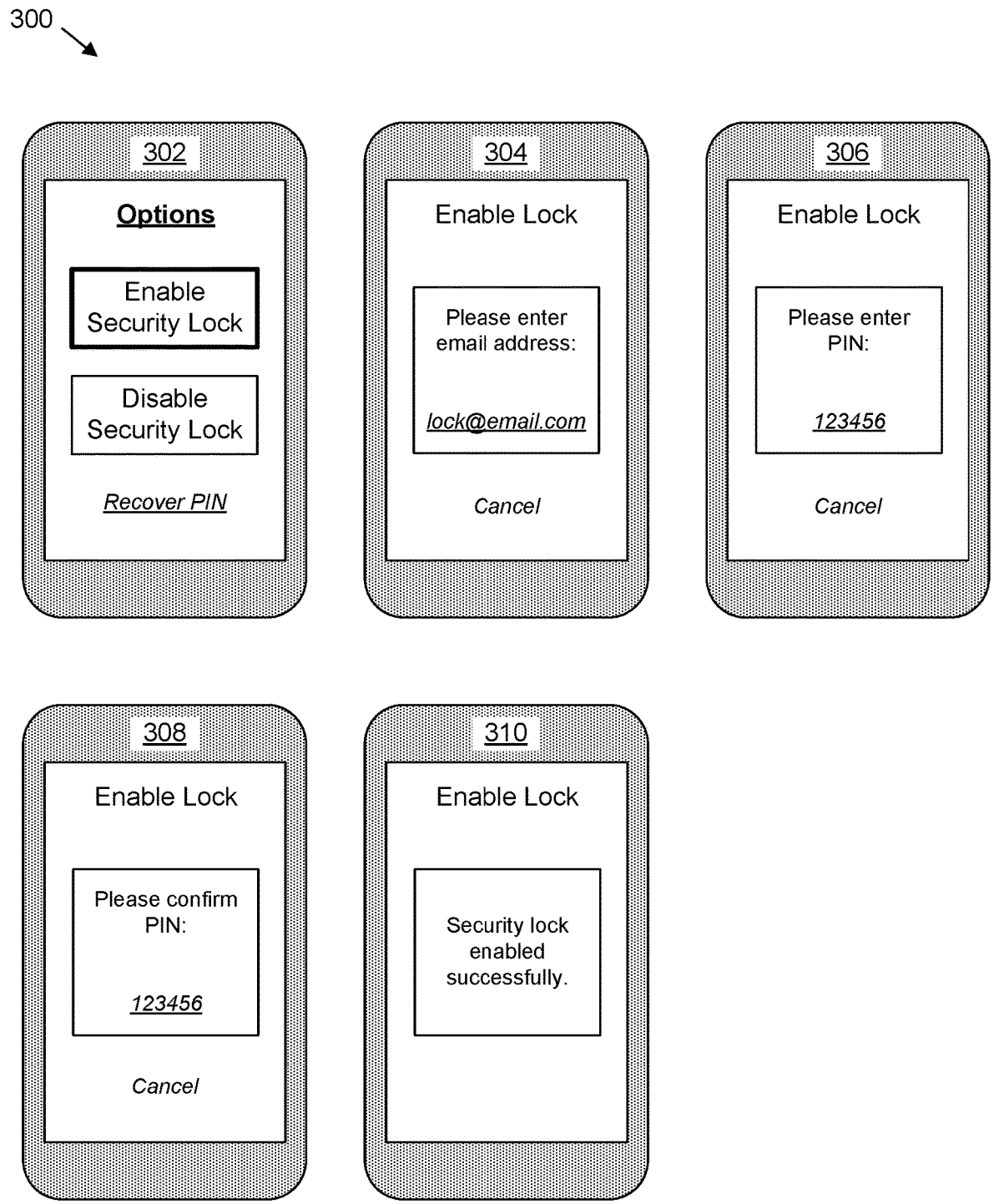
FIG. 3 is a diagram depicting respective stages of a process for enabling a mobile device security lock in accordance with one or more embodiments described herein.

Diagram 300 in FIG. 3 illustrates screen displays 302-310 associated with an example procedure for enabling a security lock on the secured device. To lock the secured device, a user of the application can first press or otherwise engage an enable security button, as shown by display 302. Next, the user can be prompted for login credentials such as a registered email address, as shown by screen 304, and a PIN, password, or other similar credential(s), as shown by screen 306. The user may also be prompted to confirm some or all of the provided login credentials, as shown by screen 308. As a result of a successful login attempt, one or more communication features of the secured device are locked, and a confirmation that a security lock has been enabled is displayed, as shown by display 310.

In an aspect, a user of the application shown by FIG. 3 can change his or her PIN, password, or other login credentials as desired (e.g., in the event of a lost or forgotten PIN, etc.) by initiating a password retrieval process using a pre-registered email address. An example password retrieval process is described in further detail below with respect to FIGS. 7-8.

Once the secured device has been locked as shown in FIG. 3, in the absence of the device that locked it, it will not be able to function with another smartphone or another mobile device that is not already in its paired list and/or another list of pre-authorized devices. Stated another way, the functionality of the secured device can be disabled in response to pairing with any new smartphone and/or other mobile device. However, the secured device can continue to function normally with previously connected and/or pre-authorized devices even without the device that locked it.

Figure 4:
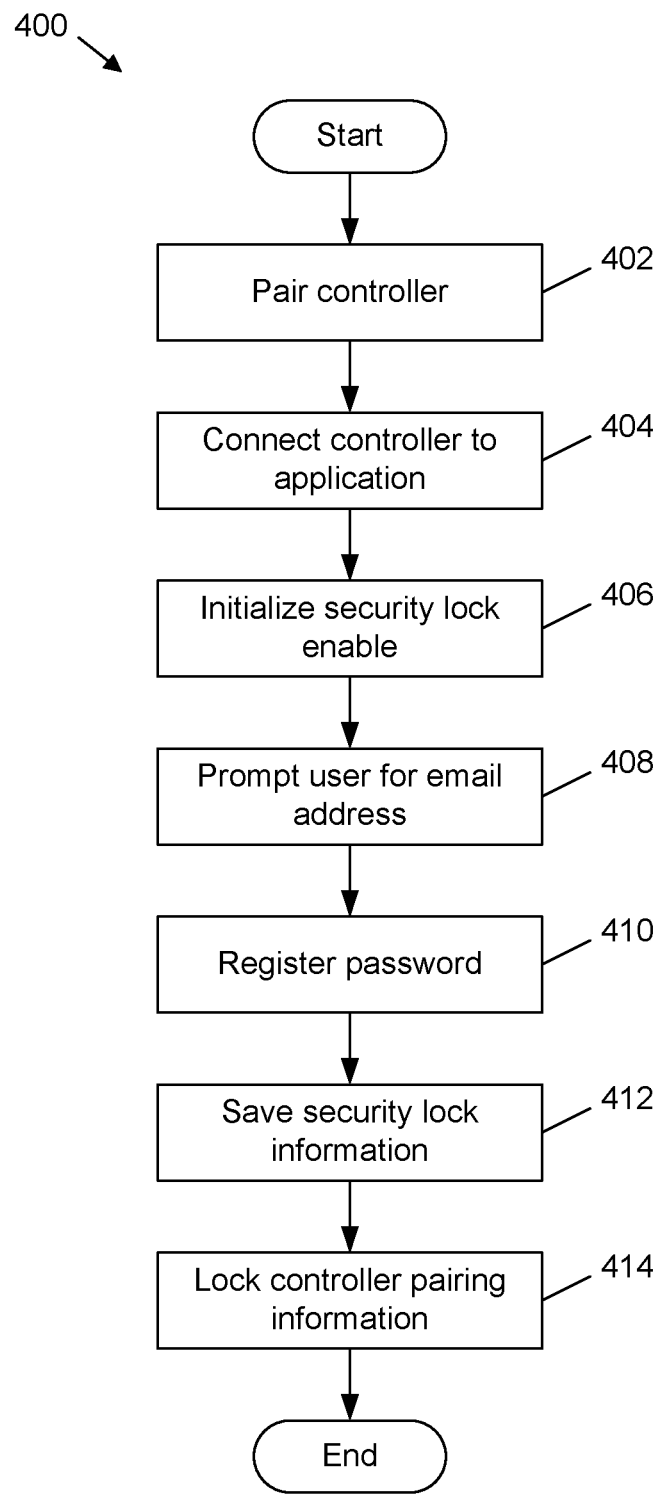
FIG. 4 is a block flow diagram of a process for enabling a mobile device security lock as shown in FIG. 3.

Turning to FIG. 4, a flow diagram of a process 400 for enabling a security lock at a secured device, e.g., as shown by FIG. 3, is provided. To enable the security lock, a communication controller for the secured device is first paired to the locking device, as shown at 402. At 404, a user can connect the communication controller for the secured device to an application or other interface running on the locking device.

At 406, in response to successful connection, the user can be presented with an option to enable the security lock for the secured device inside the application. At 408, the user is prompted for his or her email address. The user may also be prompted for other information, such as a PIN or password.

At 410, information such as the user's email address, the Bluetooth address or other identifying information for the secured device, PIN, password, etc., can be collected for security lock registration and stored at a remote registration server and/or another distinct computing device for reference. Additionally, information pertaining to the security lock for the secured device can be saved remotely (e.g., at the registration server) and/or locally at the locking device at 412.

At 412, in response to enabling the security lock, the controller pairing information for the secured device can be locked down such that some or all features of the secured device will be unable to be used unless the controller of the secured device is connected to a recognizable device.

In an aspect, the application described above can additionally be utilized to unlock the controller features of a device. There can be various scenarios in which a user desires to pair a secured device with a new device, e.g., another smartphone, in the absence of the original locking device. For instance, a user's primary smartphone may be low on battery power, lost (e.g., during travel), and/or otherwise unable to be used. In this case, the user can pair the secured device to another smartphone or other locking device via the application to unlock the device. After the secured device is unlocked, then the secured device can again be used with any other smartphone or other device and work normally.

Figure 5:
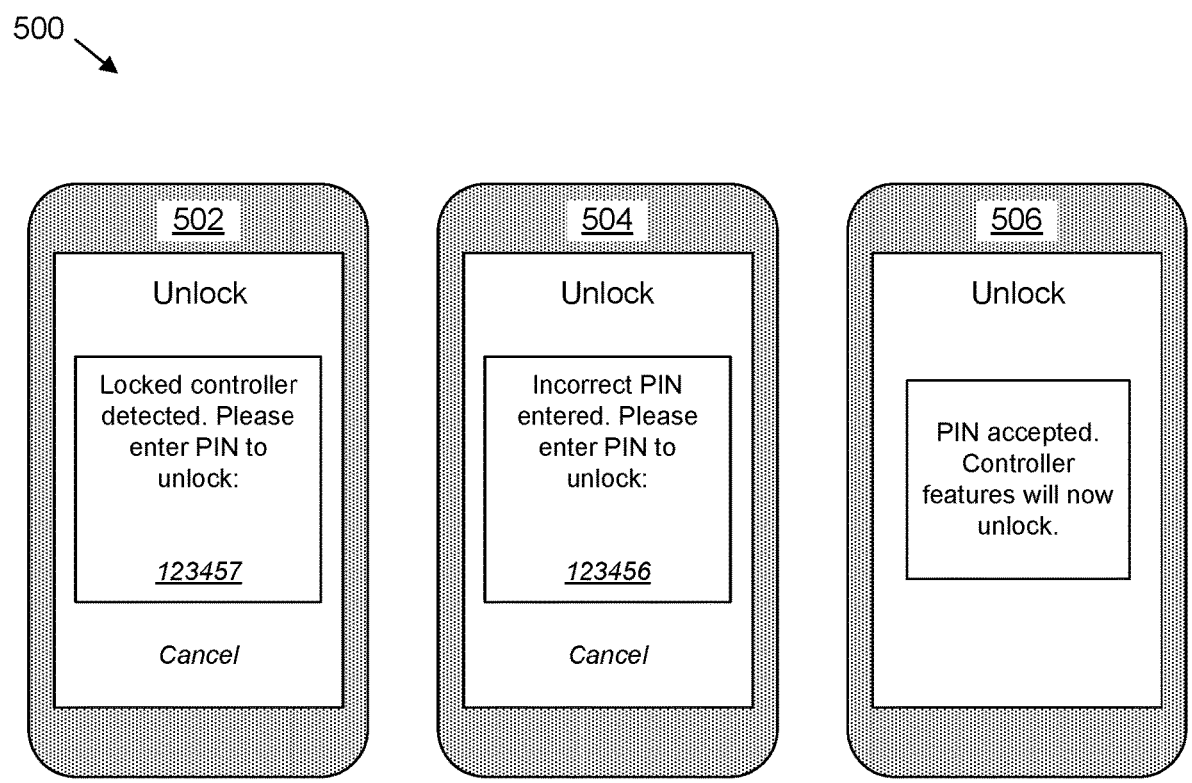
FIG. 5 is a diagram depicting respective stages of a process for disabling a mobile device security lock in accordance with one or more embodiments described herein.

Diagram 500 in FIG. 5 shows example interface displays 502-506 associated with unlocking the controller features of a secured device. When a locked secured device is connected to a non-trusted device (e.g., a smartphone with which the secured device has not previously paired), and the original locking device is powered off, out of range, or otherwise not present, the controller features of the secured device will be disabled for use by the new device. Instead, the secured device can cause the new device, via the application used as described above with respect to FIGS. 3-4 or another application, to prompt the user of the new device for security credentials associated with the secured device. If such an application is not present on the new device, the secured device can prompt the user of the new device to download or otherwise acquire the application, or the user can download the application based on other information (e.g., information printed on the secured device itself, information given in documentation for the secured device, etc.).

As shown by display 502, once acquired, the application can prompt the user for his or her PIN. In the event that an incorrect PIN is entered, the application can re-prompt the user for the correct PIN as shown at diagram 504. In one example, the application may lock out a user and/or otherwise prevent attempts to enter credentials after a predetermined number of failed attempts in order to mitigate brute force attacks. Upon entry of the correct PIN, the controller features of the secured device can unlock and a confirmation can be displayed as shown by display 506.

Upon unlocking the secured device at a new device as described above, the secured device can register the new device as a trusted device. In an aspect, the secured device can also permit the new device to provide authorization for connection to other non-trusted devices in response to registering the new device as a trusted device. This registration can be a temporary registration such that if the new device is powered down or restarted, the secured device can once again lock, and the controller features of the secured device can again be disabled if the device that locked it is not present. In this example, the secured device could also be temporarily unlocked again by the new device using the procedure described above.

Figure 6:
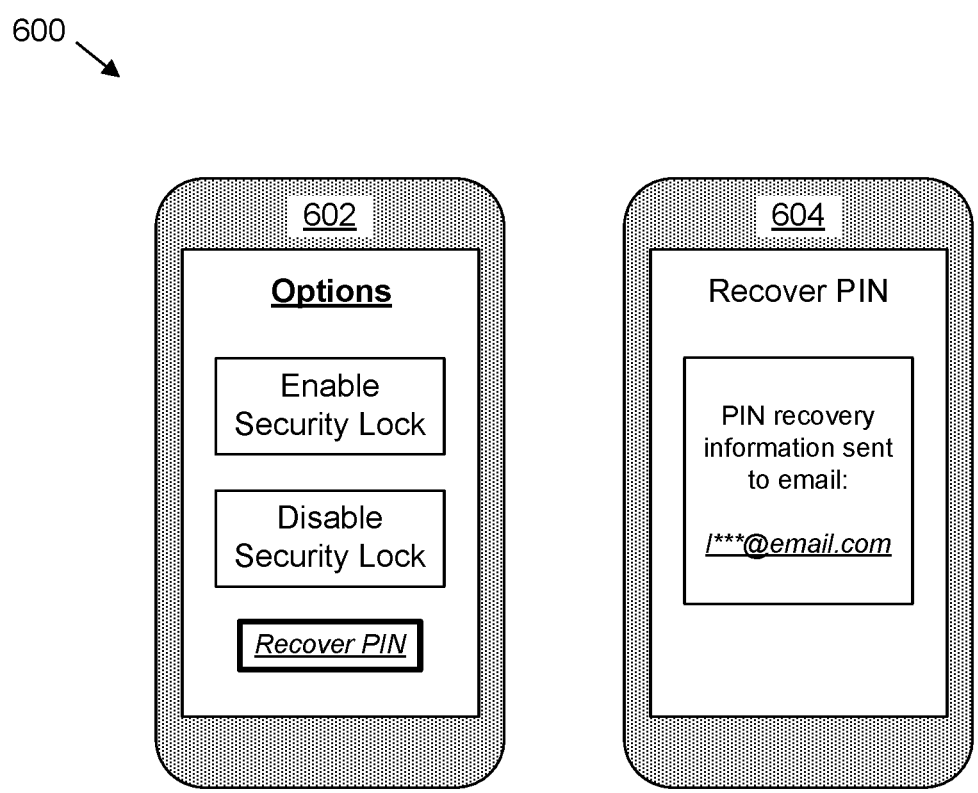
FIG. 6 is a diagram depicting respective stages of a process for security lock password retrieval in accordance with one or more embodiments described herein.

If the user of the application described above forgets his or her PIN or password, the user can initiate a retrieval process as shown by diagram 600 in FIG. 6. For instance, the user can select a PIN recovery option as shown by display 602. In response, the application (e.g., via a remote authentication server or the like) can provide the user's PIN to his or her registered email address, as shown by display 604. The PIN for a given user can be given in response to selecting the PIN recovery option as shown by display 602, or alternatively the user may additionally be prompted for his or her email address or other confirmation information. In the event that an email address is entered, a PIN associated with that email address, if any, can be sent to the provided address.

Figure 7:
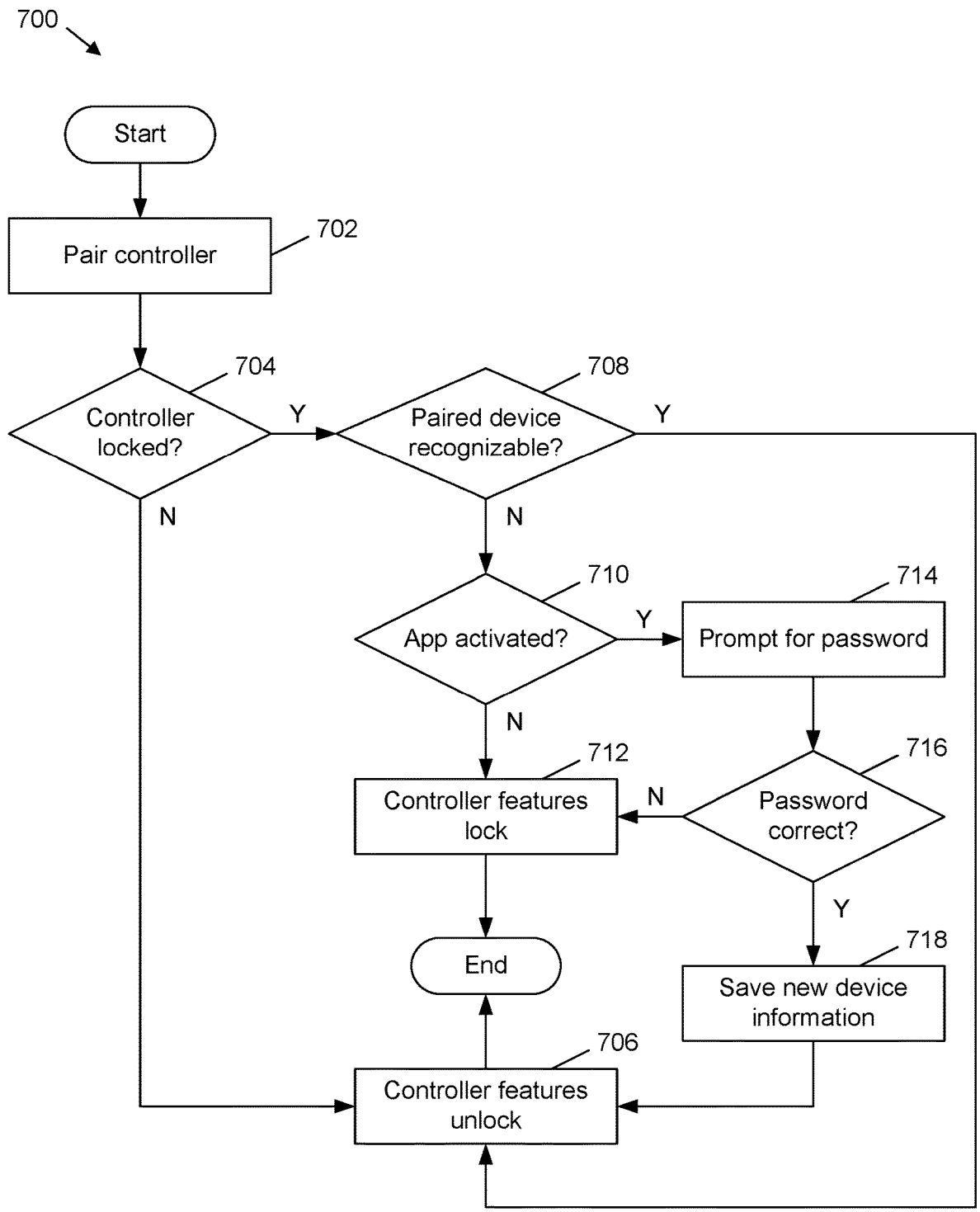
FIG. 7 is a block flow diagram of a process for operating a mobile device subject to a security lock in accordance with one or more embodiments described herein.

Turning next to FIG. 7, a flow diagram of a process 700 for managing controller features of a mobile communication device is illustrated. At 702, the controller of a security-enabled device, e.g., a Bluetooth device, is paired with a user device (e.g., a smartphone, laptop or desktop computer, etc.). At 704, the security-enabled device initiates one or more security measures in response to whether the controller of the device is locked. If the controller is not locked, the controller features of the device unlock at 706 and the device can operate normally. Otherwise, the process 700 continues to 708 for further security checks.

At 708, the security-enabled device determines whether the device to which it was paired at 702 is recognizable, e.g., as a previously connected device or an otherwise trusted device. If the paired device is recognizable, the controller features of the device are unlocked as shown at 706. Otherwise, the security-enabled device determines at 710 whether a security management application, e.g., an application as illustrated by displays 502-506 in FIG. 5, has been activated at the paired device. If such an application is determined to not be active, the controller features of the security-enabled device lock at 712 and further communication between the security-enabled device and the paired device is prevented.

If a security management application is active at the paired device, the user of the application is prompted for a password, PIN, or other credentials at 714. The credentials collected in response to the prompt at 714 are then authenticated at 716. If the authentication at 716 is unsuccessful, e.g., a correct PIN or password was not entered, the process 700 proceeds to 712 and the controller features of the security-enabled device are locked.

If the authentication at 716 succeeds, e.g., a correct PIN or password was entered, information for the paired device is saved by the security-enabled device at 718. For instance, the security-enabled device can accept the credentials provided by the paired device, or an unlock command or other message provided by the paired device and authenticated via the provided credentials, as an authorization to communicate with the paired device. In response to this authorization, the security-enabled device can register the paired device as a trusted or previously connected device, even if the paired device was previously a non-trusted device (e.g., not registered as a trusted device) in relation to the security-enabled device. In addition to registering the paired device, the security-enabled device can also unlock the controller features of the device in response to correct authentication at 706.

In an aspect, the security lock associated with a mobile communication device can disable one or more communication features of the device when a non-trusted device is detected. For instance, a Bluetooth device can be configured such that the security lock disables one or more Bluetooth communication profiles, such as an Advanced Audio Distribution Profile (A2DP), an Intercom Profile (ICP), a Hands-Free Profile (HFP), or the like. These and/or other communication features can be unlocked in response to the controller of the Bluetooth device being connected to a recognizable device or by a user providing correct authentication credentials, e.g., a registered password. Here, recognizable devices are defined as devices that have previously been connected to the controller. To unlock the Bluetooth device using a password, the controller at the Bluetooth device first connects to the associated application at the unlocking device, which can then prompt the user for the associated security lock password. Once password verification has passed, device information for the unlocking device can be stored for future device recognition, and the controller features of the Bluetooth device can be unlocked. Conversely, if a user is unable to provide a recognizable device or a password, the controller features of the Bluetooth device will be unavailable for use.

Figure 8:
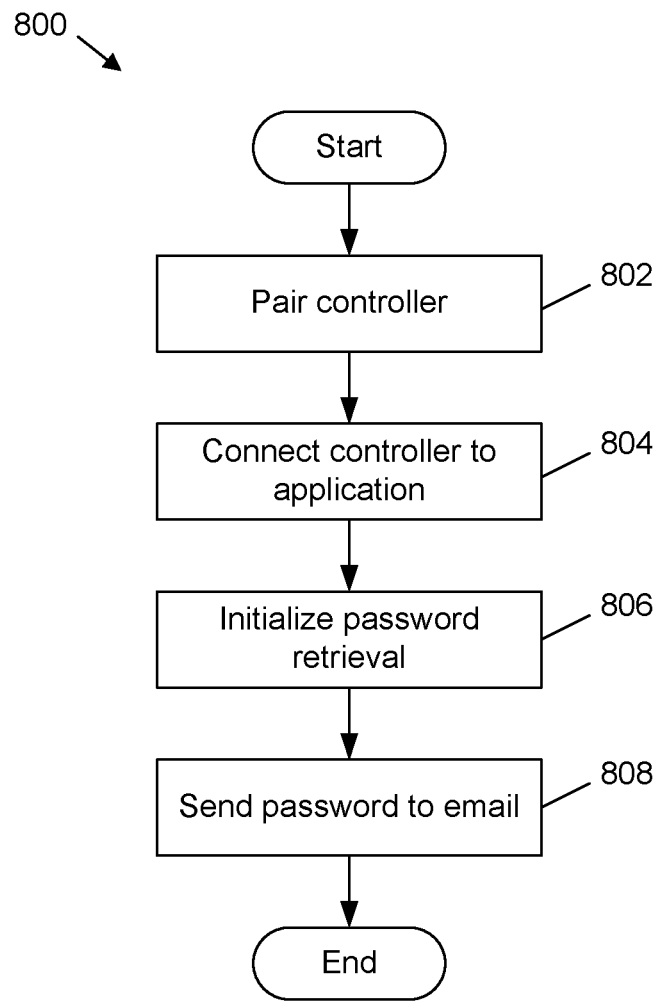
FIG. 8 is a block flow diagram of a process for enabling a mobile device security lock as shown in FIG. 6.

Referring next to FIG. 8, a flow diagram of a process 800 for retrieving a security lock password, e.g., using the application shown by displays 602-604, is provided. To retrieve a password, the controller of an associated secured device is paired to a smartphone or other unlocking device at 802. The controller is then connected to an application at the unlocking device at 804, and password retrieval is initiated from within the application (e.g., by a user selection of a password retrieval option, etc.) at 806. In response to password retrieval being initialized at 806, the password associated with the controller is sent to the email address that was registered for the security lock features of that controller at 808.

Figure 9:
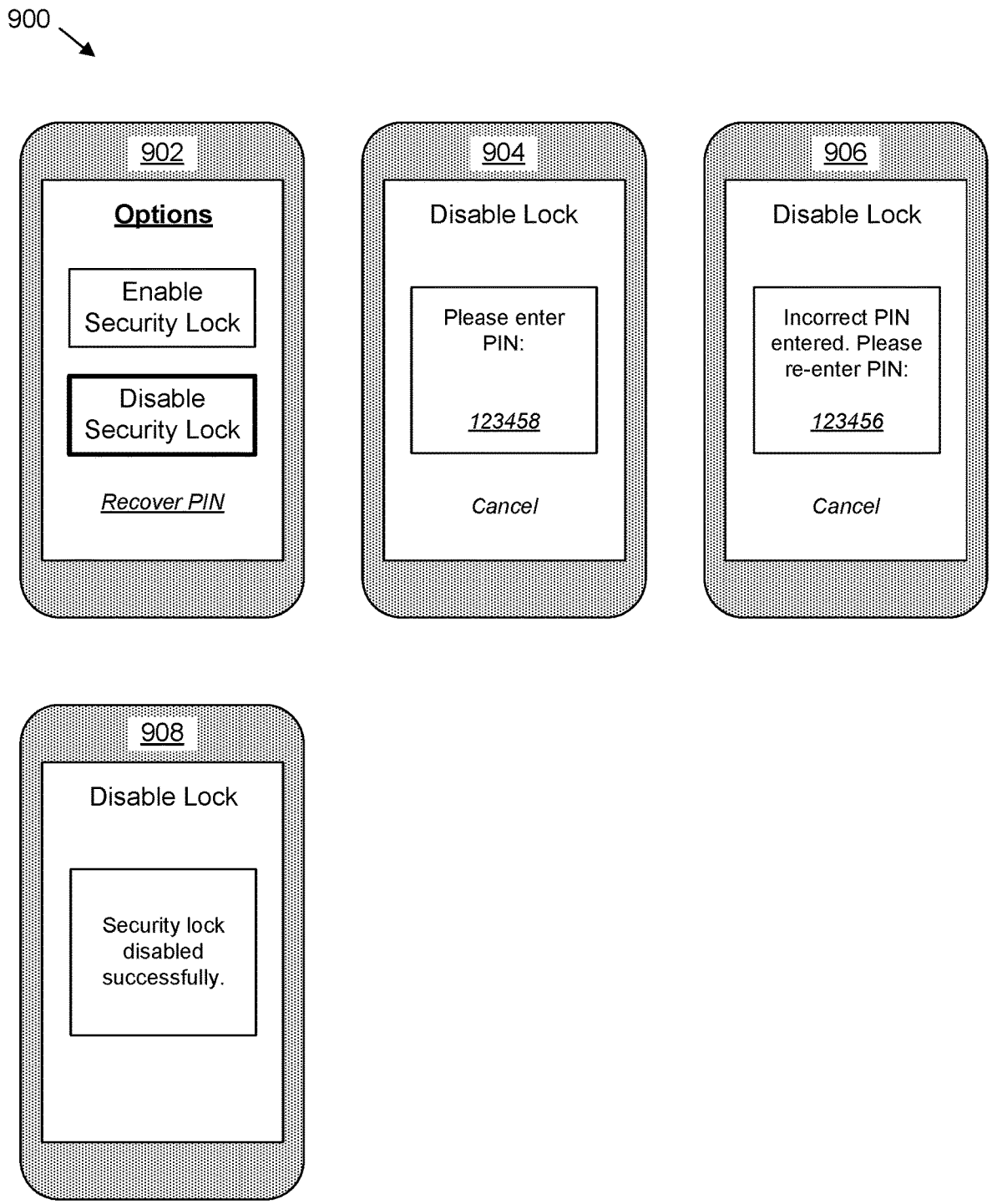
FIG. 9 is a diagram depicting respective stages of a process for enabling a unlocking controller features of a remote device in accordance with one or more embodiments described herein.

Turning to FIG. 9, diagram 900 shows interface displays 902-908 associated with disabling a security lock associated with a secured device. In an aspect, a user can disable security features of a device by utilizing an application such as that described above with respect to FIGS. 3-8. Disabling the security lock associated with a device may be desirable, for example, if a user wants to loan the device to another person, sell the device, or otherwise transfer possession of the device. In such a case, the user can disable the security features of the device such that they can be later re-enabled by a new user if desired.

First, as shown by display 902, a user can select an option to disable the security lock for a device within the security management application. Upon selecting this option, the user can be prompted for a PIN or password, as shown by display 904. If an incorrect PIN or password is entered, the user can be re-prompted for such information as shown by display 906. Alternatively, the application can be configured to lock out the user and/or otherwise limit the user's ability to attempt disabling the security lock after one or more incorrectly entered passwords are provided. If a correct PIN or password is entered, the security lock can be disabled, e.g., by providing an unlock command from a device associated with the application to the secured device. In response to receiving the unlock command, the secured device can then re-enter an open access mode and exit a locked or limited access mode, e.g., by ceasing to condition communication with non-trusted devices on receipt of an authorization from a trusted device. In addition, the application can provide confirmation that the security lock was disabled as shown by display 908. In an aspect, once the security lock has been disabled, the secured device can be configured to pair with any device unconditionally and/or otherwise function normally.

Figure 10:
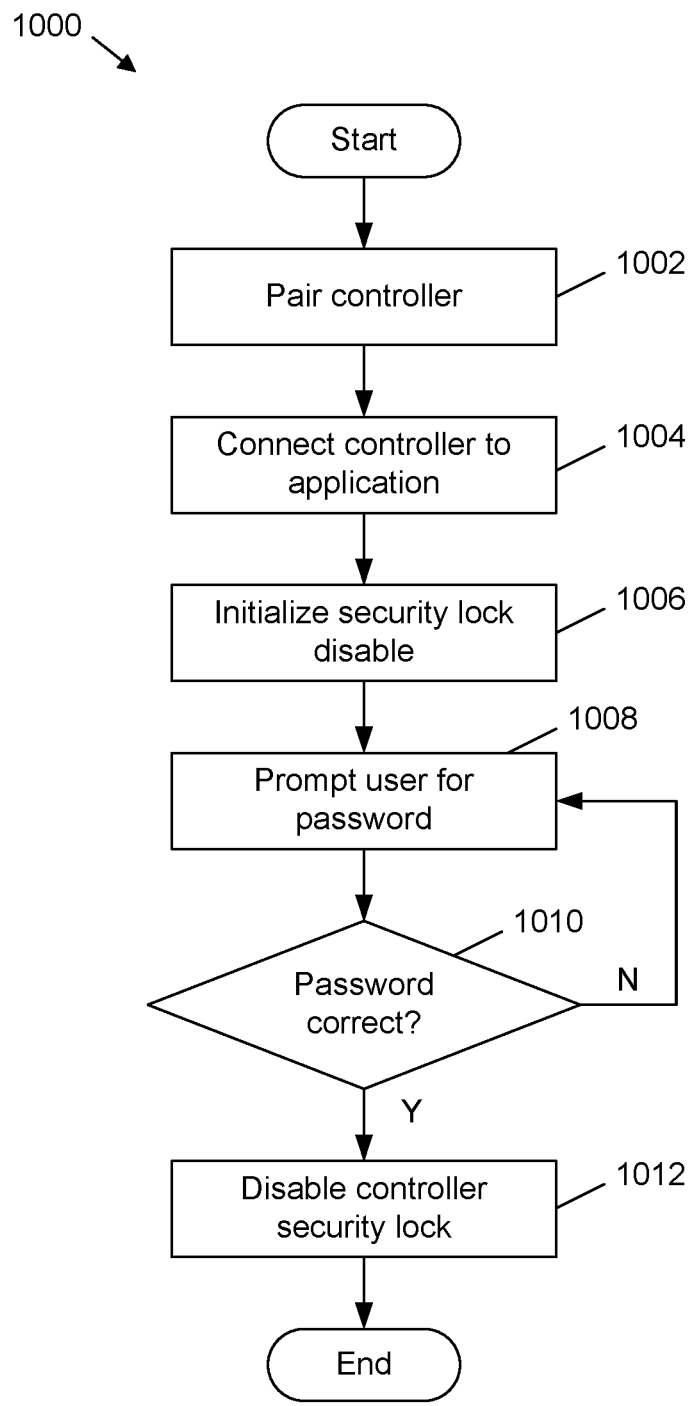
FIG. 10 is a block flow diagram of a process for enabling a mobile device security lock as shown in FIG. 9.

Turning to FIG. 10, a flow diagram of a process 1000 for disabling security features of a device is provided. The controller of a secured device is paired with an unlocking device such as a smartphone at 1002 and subsequently connected to an application (e.g., an application as described above with respect to FIG. 9) at 1004. At 1006, a security lock disabling procedure is initiated, e.g., by a user selection of a disable option at the application. At 1008, the user is prompted for a password or other credentials. At 1010, the process 1000 can attempt to authenticate the password entered at 1008 and cause the process to repeat the prompt at 1008 in the event that an incorrect password is provided. In response to receiving a correct password, the security lock of the controller is disabled at 1012.

Figure 11:
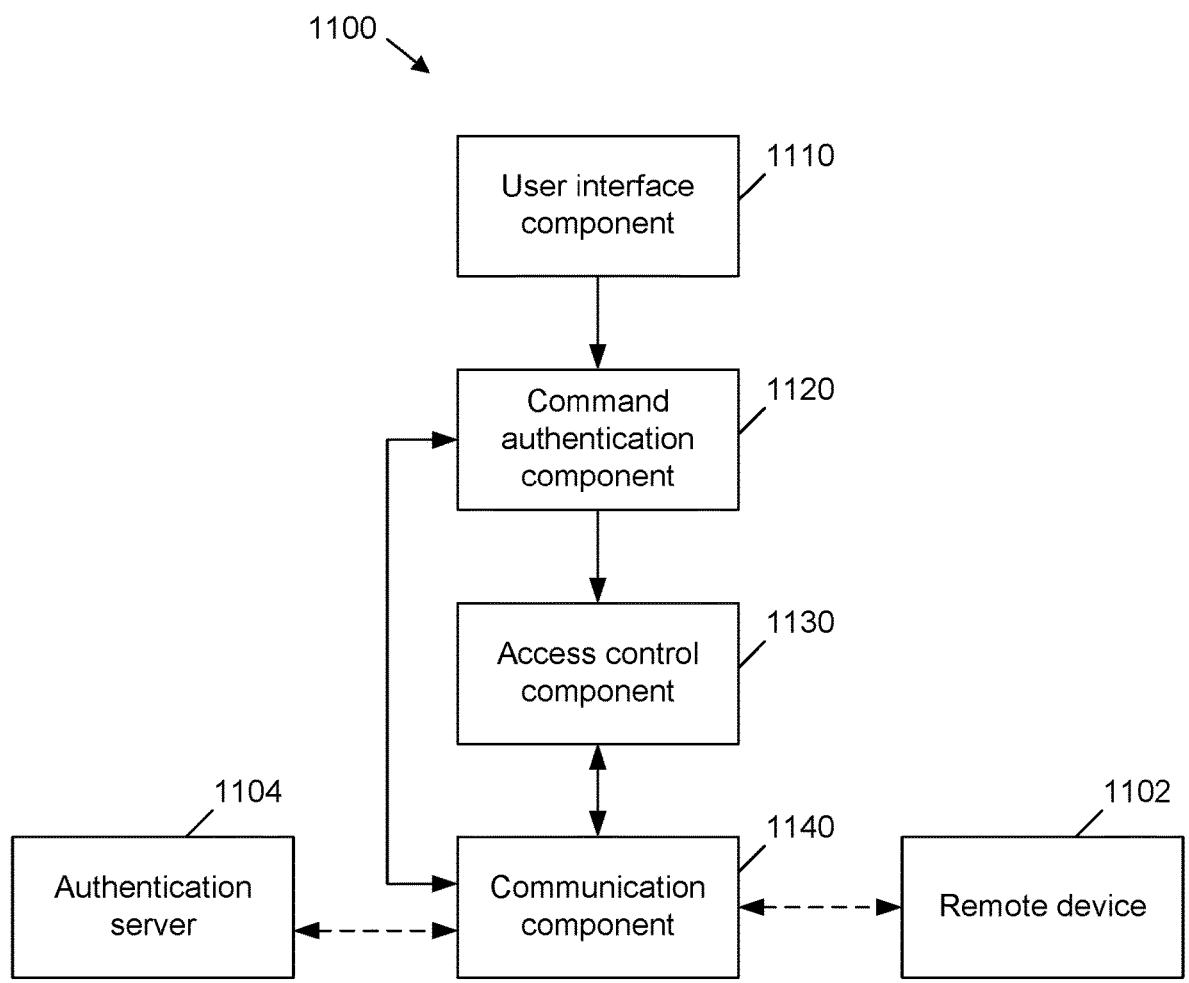
FIG. 11 is a block diagram of another system that facilitates implementation of mobile device security controls in accordance with one or more embodiments described herein.

Referring next to FIG. 11, a block diagram of a system 1100 that facilitates implementation of mobile device security controls in accordance with one or more embodiments described herein is provided. In an aspect, the system 1100 can be implemented at a smartphone or other computing device to control access to communication features of a remote device 1102, e.g., a Bluetooth device or other mobile device and/or accessory.

The system 1100 includes a user interface component 1110 that provides various prompts to a user, e.g., as part of an application. The user interface component 1110 can also receive input from a user, e.g., in response to prompts provided to the user or other interface elements, relating to security features of the remote device 1102. These inputs can be interpreted by the system 1100 as commands, which can be authenticated by a command authentication component 1120. In response to successful command authentication by the command authentication component 1120, an access control component 130 can regulate (enable, disable, lock, unlock) one or more security features of the remote device 1102.

In an aspect, the command authentication component and access control component 1130 can operate in conjunction with a communication component 1140 that enables communication between the system 1100 and one or more other entities via a wired and/or wireless communication technology or combination of technologies. In addition to enabling communication between the system 1100 and remote device 1102, the system 1100 can also communicate with other entities via the communication component 1140, such as an authentication server 1104 that contains information relating to the user and/or the user's password or other credentials and assists in and/or performs authentication of user commands.

Figure 12:
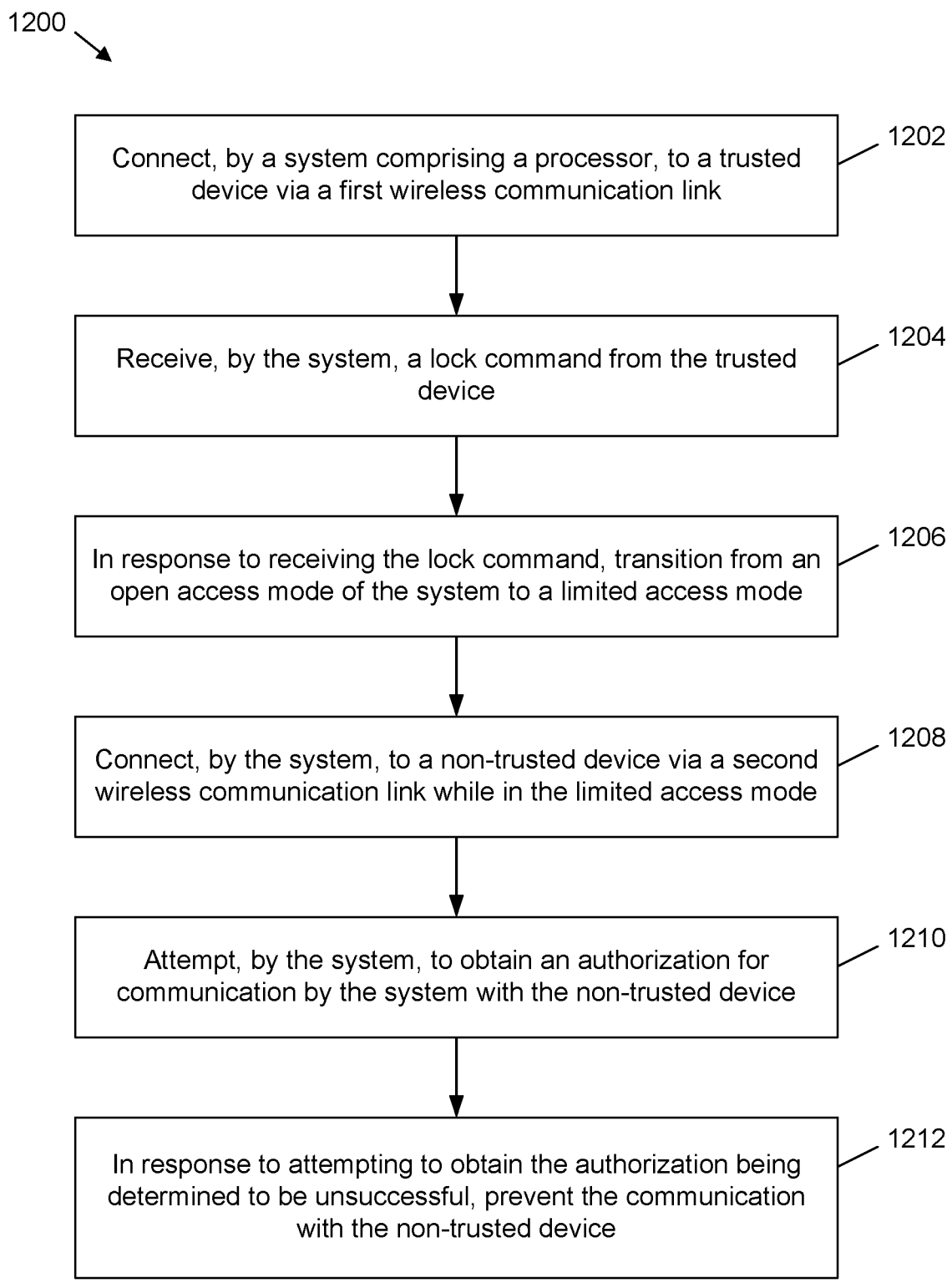
FIG. 12 is a block flow diagram of a process for managing access to communication features of a mobile device in accordance with one or more embodiments described herein.

Turning next to FIG. 12, illustrated is a flow diagram of a process 1200 for managing access to communication features of a mobile device in accordance with one or more embodiments described herein. At 1202, a system comprising a processor (e.g., system 100 as implemented by a Bluetooth device or other mobile communication device) connects to a trusted device via a first wireless communication link.

At 1204, the system receives (e.g., via a communication component) a lock command from the trusted device. At 1206, in response to receiving the lock command at 1204, the system transitions (e.g., via a mode selection component 120) from an open access mode of the system to a limited access mode.

At 1208, the system connects to a non-trusted device via a second wireless communication link while in the limited access mode initiated at 1206. At 1210, the system attempts (e.g., via an authentication component 130) to obtain an authorization for communication by the system with the non-trusted device. At 1212, in response to attempting to obtain the authorization being determined to be unsuccessful, the system prevents (e.g., via a control component 140) the communication with the non-trusted device.

Figure 13:
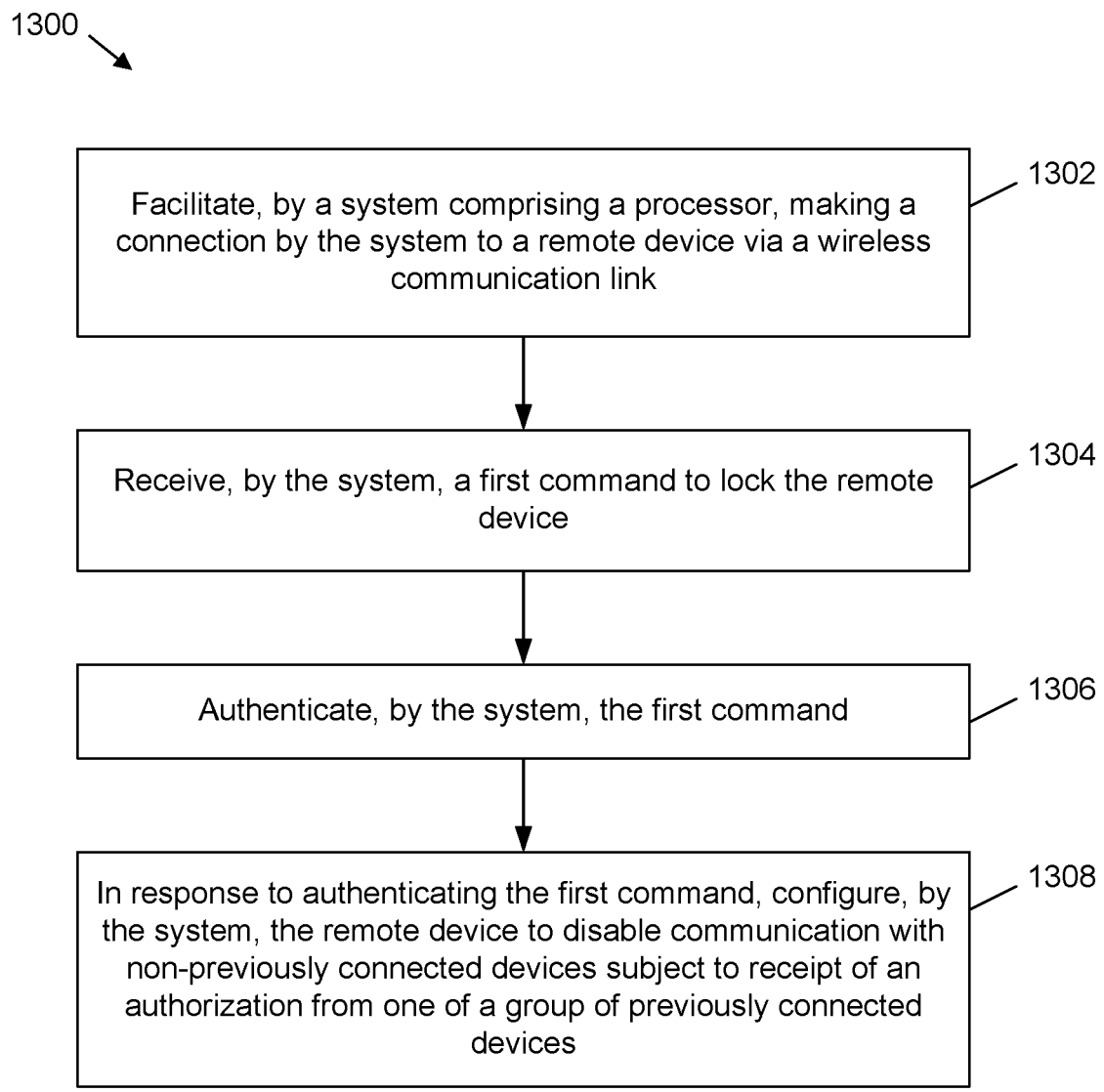
FIG. 13 is a block flow diagram of a process for controlling a mobile device security lock in accordance with one or more embodiments described herein.

FIG. 13 illustrates a flow diagram of a process 1300 for controlling a mobile device security lock in accordance with one or more embodiments described herein. At 1302, a system comprising a processor (e.g., system 1100 as implemented by a smartphone or other computing device) facilitates making a connection (e.g., via a communication component 1140) by the system to a remote device (e.g., remote device 1102) via a wireless communication link.

At 1304, the system receives (e.g., via a user interface component 1110) a first command to lock the remote device. At 1306, the system authenticates (e.g., via a command authentication component 1120 and/or based on communication with an authentication server 1104 as performed by the communication component 1140) the first command. At 1308, in response to authenticating the first command, the system configures (e.g., via the access control component 1130 and the communication component 1140) the remote device to disable communication with non-previously connected devices subject to receipt of an authorization from one of a group of previously connected devices.

FIGS. 4, 7, 8, 10, 12, and 13 as described above illustrate respective methods in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 14:
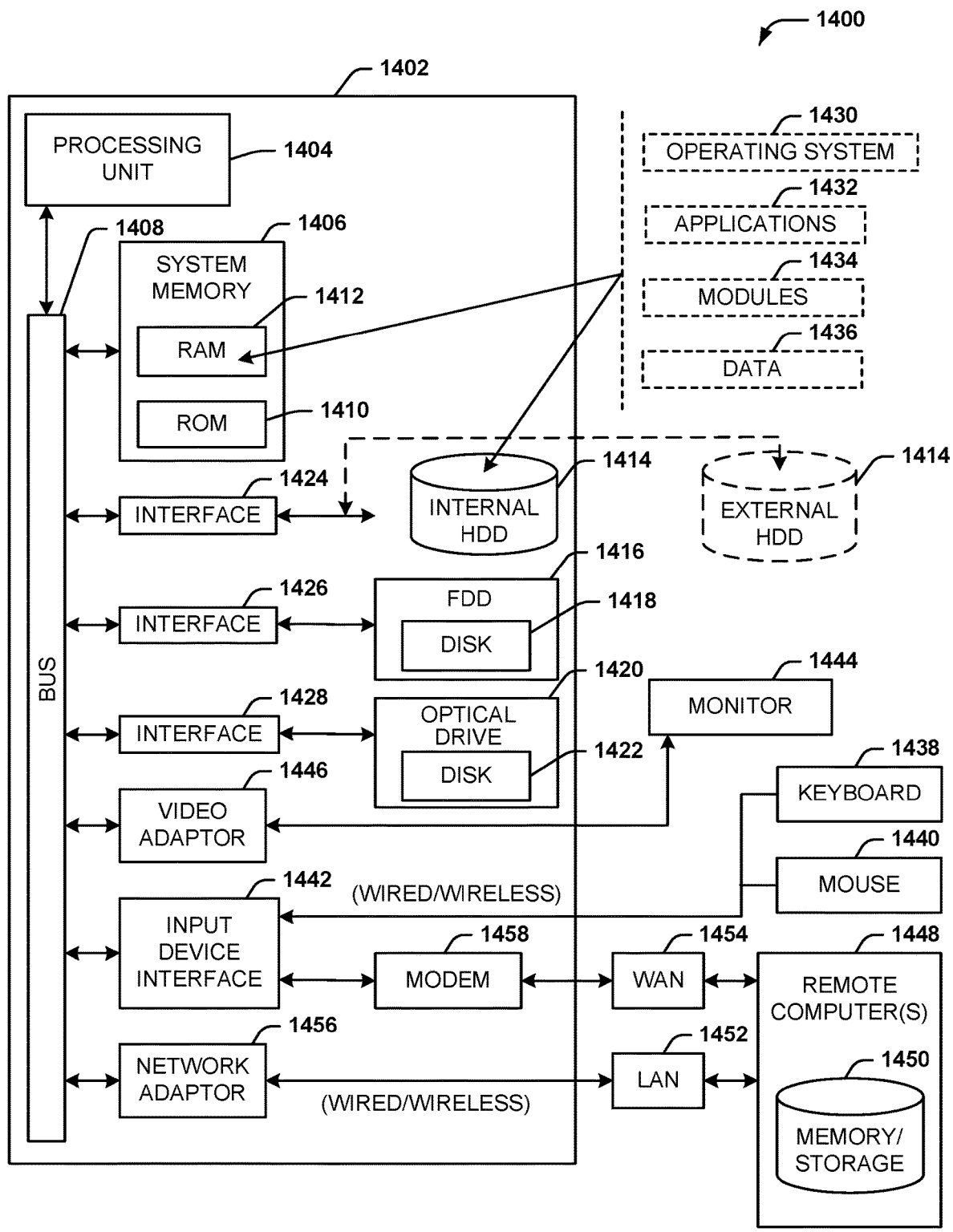
FIG. 14 is a block diagram of an example, non-limiting operating environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). While the internal HDD 1414 is illustrated as located within the computer 1402, the internal HDD 1414 can also be configured for external use in a suitable chassis (not shown). The HDD 1414, magnetic FDD 1416 and optical disk drive 1420 can be connected to the system bus 1408 by an HDD interface 1424, a magnetic disk drive interface 1426 and an optical drive interface 1428, respectively. The interface 1424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an infrared (IR) remote control, a joystick, a game pad, a stylus pen, touch screen or the like. These and other input devices are often connected to the processing unit 1404 through an input device interface 1442 that can be coupled to the system bus 1408, but can be connected by other interfaces, such as a parallel port, an IEEE 1394 serial port, a game port, a USB port, an IR interface, etc.

A monitor 1444 or other type of display device can be also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the wireless adapter 1456.

When used in a WAN networking environment, the computer 1402 can include a modem 1458 or can be connected to a communications server on the WAN 1454 or has other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

connecting, by a system comprising a processor, to a trusted device via a first wireless communication link;

receiving, by the system, a lock command from the trusted device;

in response to receiving the lock command, transitioning from an open access mode of the system to a limited access mode;

connecting, by the system, to a non-trusted device via a second wireless communication link while in the limited access mode;

attempting, by the system, to obtain an authorization from the trusted device for communication by the system with the non-trusted device;

in response to the attempting to obtain the authorization being determined to be unsuccessful, attempting, by the system, to authenticate security credentials received from the non-trusted device; and in response to the attempting to obtain the authorization being determined to be unsuccessful and further in response to the attempting to authenticate the security credentials being determined to be unsuccessful, preventing the communication with the non-trusted device.

2. The method of claim 1, wherein the preventing comprises disabling access by the non-trusted device to one or more communication features for the communication with the non-trusted device.

3. The method of claim 2, wherein the one or more communication features comprise at least one of an advanced audio distribution profile, an intercom profile, or a hands-free profile.

4. The method of claim 1, wherein the authorization comprises information received via an active connection with the trusted device.

5. The method of claim 4, further comprising:
disconnecting, by the system, from the trusted device; and
in response to the disconnecting, ceasing the communication with the non-trusted device and preventing further communication with the non-trusted device.

6. The method of claim 1, wherein the trusted device is a first trusted device, and wherein the method further comprises:
in response to the attempting to authenticate the security credentials being successful, enabling, by the system, the communication with the non-trusted device; and
in response to enabling the communication with the non-trusted device, registering, by the system, the non-trusted device as a second trusted device instead of as the non-trusted device.

7. The method of claim 1, further comprising:
receiving, by the system, an unlock command from the trusted device; and
in response to the receiving the unlock command, exiting, by the system, the limited access mode and returning, by the system, to the open access mode.

8. The method of claim 6, further comprising:
reregistering, by the system, the second trusted device as the non-trusted device instead of as the second trusted device in response to the second trusted device being powered down.

9. The method of claim 1, wherein the attempting to authenticate the security credentials associated comprises attempting to authenticate the security credentials with an authentication server that is distinct from the non-trusted device.

10. The method of claim 1, further comprising:
receiving, by the system, the security credentials via an application running on the non-trusted device.

11. A system, comprising:
a processor; and
a memory that stores executable components that, when executed by the processor, facilitate performance of operations, the executable components comprising:
a communication component that connects to a first device via a first wireless communication link and to a second device via a second wireless communication link;
a mode selection component that initiates a restricted access mode of the system in response to reception of a lock command from the first device via the communication component;
an authentication component that attempts to match an identity of the second device with at least one of a group of trusted devices in response to the restricted access mode being initiated by the mode selection component, wherein the authentication component further attempts to obtain an authorization from the first device for communication by the communication component with the second device in response to unsuccessfully attempting to match the identity of the second device with at least one of the group of trusted devices, and wherein the authentication component further attempts to authenticate security credentials received from the second device in response to unsuccessfully attempting to obtain the authorization; and
a control component that disables communication with the second device in response to the authentication component unsuccessfully attempting to match the identity of the second device with at least one of the group of trusted devices, the authentication component unsuccessfully attempting to obtain the authorization, and the authentication component unsuccessfully attempting to authenticate the security credentials from the second device.

12. The system of claim 11, wherein the authorization comprises information obtained via an active connection with the first device.

13. The system of claim 12, wherein the control component ceases the communication with the second device and prevents further communication with the second device in response to the authentication component unsuccessfully attempting to match the identity of the second device and in response to the communication component disconnecting with the first device.

14. The system of claim 11, wherein the mode selection component initiates an open access mode of the system and exits the restricted access mode in response to receiving an unlock command from the first device via the communication component.

15. A method, comprising:
facilitating, by a system comprising a processor, making a connection by the system to a remote device via a wireless communication link;
receiving, by the system, a first command to lock the remote device;
authenticating, by the system, the first command;
in response to authenticating the first command, attempting, by the remote device, to obtain an authorization from the system for communication by the remote device with a non-previously connected device;
in response to the attempting to obtain the authorization being determined to be unsuccessful, attempting, by the remote device, to authenticate security credentials received from the non-previously connected device; and
configuring, by the system, the remote device to disable communication with the non-previously connected device in response to the attempting to obtain the authorization being determined to be unsuccessful and further in response to the attempting to authenticate the security credentials being determined to be unsuccessful.

16. The method of claim 15, wherein the connection to the remote device is a first connection to a first remote device, wherein the authorization is a first authorization, and the method further comprises:

facilitating, by the system, making a second connection by the system to a second remote device via the wireless communication link;

obtaining, by the system, an indication that communication with the second remote device is disabled subject to receipt of a second authorization;

receiving, by the system, a second command to provide the second authorization to the second remote device;

authenticating, by the system, the second command; and in response to authenticating the second command, sending, by the system, the second authorization to the second remote device for the communication with the second remote device.

17. The method of claim 16, further comprising:

registering, by the system, with the second remote device as one of the group of previously connected devices for the second remote device in response to the authenticating of the second command.

18. The method of claim 16, wherein the authenticating of the first command and the authenticating of the second command utilize a same credential.

19. The method of claim 15, further comprising:

receiving, by the system, a second command to unlock the remote device;

authenticating, by the system, the second command; and in response to the authenticating of the second command, configuring, by the system, the remote device to cease disabling the communication with the non-previously connected devices.

20. The method of claim 15, further comprising:

facilitating, by the system, the authorization being provided to the remote device using an active connection with the remote device via the wireless communication link.

* * * * *